Sept. 20, 1955     J. W. WATSON     2,718,392
LEAF SPRING SPACING STRUCTURES AND ANCHORAGES THEREFOR
Filed April 14, 1950
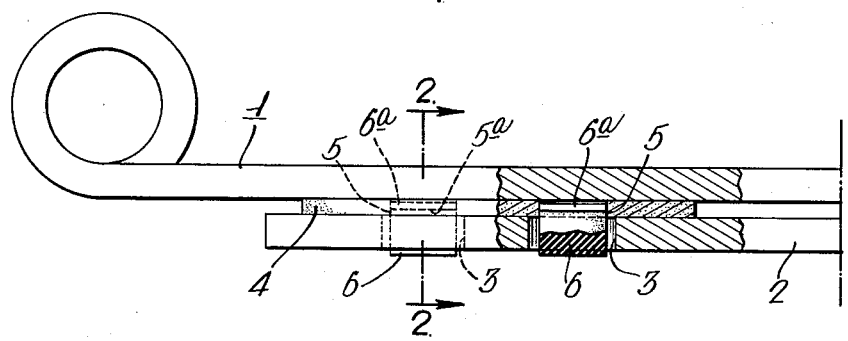
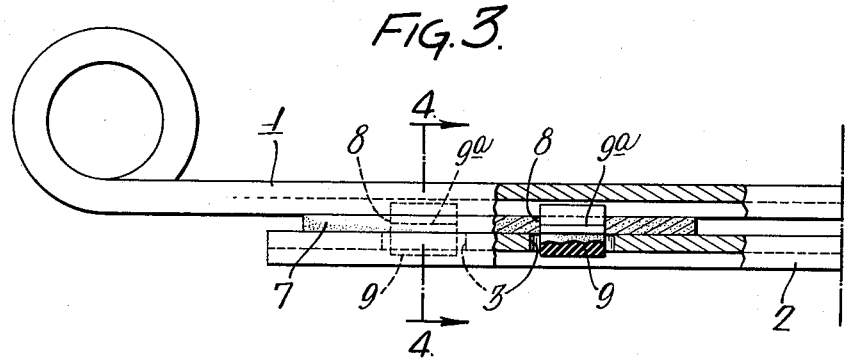
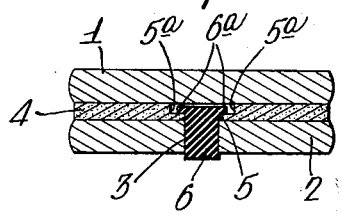 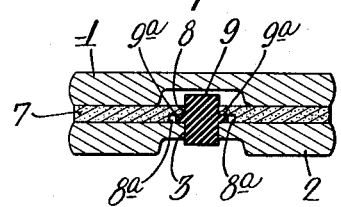
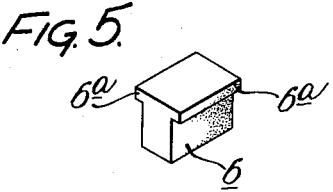 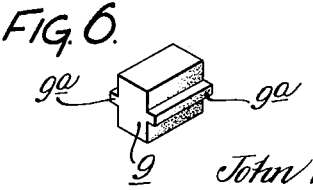
Inventor:
John Warren Watson
by his Attorneys
Howson & Howson

United States Patent Office 2,718,392
Patented Sept. 20, 1955

2,718,392

LEAF SPRING SPACING STRUCTURES AND ANCHORAGES THEREFOR

John Warren Watson, Wayne, Pa.

Application April 14, 1950, Serial No. 155,914

6 Claims. (Cl. 267—49)

This invention relates to means for holding a friction bearing structure in predetermined position between two frictionally opposed and relatively reciprocating bodies and in particular to means for holding a leaf-end friction bearing structure in predetermined position between and adjacent the ends of two opposed leaves of a leaf spring.

A particular object of my invention is to provide positive means for maintaining a bearing structure, while in service, in predetermined set position with relation to an end of one of two adjacent leaves of a leaf spring and very particularly in a manner to limit longitudinal, lateral and turning movements of the bearing structure with relation to that one leaf.

A further particular object of my invention is to provide anchoring means of a material such as soft rubber and which by reason of its deformable nature will provide for a floating action of the bearing structure with relation to the leaf to which it is anchored as set forth in my copending application of April 25, 1947, Serial No. 743,997, now Pat. 2,621,922, December 16, 1952.

A further particular object of my invention in connection with the use of soft rubber as an anchor member, and as is provided for in my above mentioned copending application, is generally to provide a hole, in the bearing structure or a hole in the leaf or a hole in both the bearing structure and the leaf, of greater volumetric size than the volume of that portion of the rubber member which resides within either one or both of said holes and in this way provide space, directly at hand, for a ready accommodation of any deformation of the rubber which is made necessary by shear relative movements between the bearing structure and the leaf and thus avoid the possibility of shear-cutting actions becoming effective.

A further particular object of my invention is to provide anchoring means as above and which is particularly designed to facilitate assembly, and sequence of assembly, as hereinafter will be described.

A further object of my invention is to provide anchoring means as above which is relatively inexpensive and which is well adapted to mass production by a molding or extrusion process.

A further particular object of my invention is to provide anchoring means such as will permit, upon the spreading of the leaves, a free and ready removal of the bearing structure and its replacement in kind.

A further particular object of my invention is to provide a leaf-end friction bearing structure presenting to at least one of said leaves a surface of sufficient yieldability to readily conform, under the pressures imposed in service, to irregularities thereof and thus form an automatic seal against the entry of grit and abrasive-laden waters.

A further particular object of my invention is to provide a leaf-end friction bearing structure which by reason for example of inclusion of a friction material of the character disclosed in U. S. Patent No. 1,845,096, or for other reason, exhibits frictional properties whereof the static and dynamic coefficients of friction are sufficiently in balance to avoid setting up destructive spasmodic actions and/or objectionable noise-producing vibrations.

Other objects and advantages of the invention will be made apparent from the following description in connection with the accompanying drawings, in which:

Figure 1 is a fragmentary side elevational view, partly in section, showing two adjacent leaves of a leaf spring, a leaf-end friction bearing structure spacing said leaves and two relatively spaced T-section soft rubber anchor members each of which is in deep penetrative engagement with an elongated recessed through hole provided in the bearing structure and an elongated round-ended hole provided in one of said leaves adjacent an end thereof in a manner to limit longitudinal, lateral and turning movements of said bearing structure with relation to said one leaf;

Figure 2 is a cross sectional view on line 2—2, Fig. 1;

Figure 3 is a fragmentary side elevational view, partly in section, showing two adjacent leaves of a leaf spring and which leaves are of center-groove section, a leaf-end friction bearing structure spacing said leaves and two relatively spaced cross-shaped soft rubber members each of which is in deep penetrative engagement with an elongated recessed through hole provided in the bearing structure and an elongated round-ended hole provided in one of said leaves adjacent an end thereof in a manner to limit longitudinal, lateral and turning movements of said bearing structure with relation to said one leaf;

Figure 4 is a cross sectional view on line 4—4, Fig. 3;

Figure 5 is an isometric view of a T-section soft rubber member as shown in Figs. 1 and 2, and Figure 6 is an isometric view of a cross-shaped soft rubber member as shown in Figs. 3 and 4.

Referring to Figs. 1 and 2, numeral 1 indicates one of two adjacent leaves of a leaf spring, 2 indicates the other of said leaves, 3 indicates each of two relatively spaced elongated and round-ended holes provided in leaf 2 adjacent an end thereof, 4 indicates a leaf-end friction bearing structure spacing said leaves, 5 indicates each of two relatively spaced elongated and recessed through holes provided in the bearing structure, 5a indicates oppositely disposed recessed portions provided in holes 5, 6 indicates each of two T-section soft rubber anchor members equipped with oppositely disposed integral flange portions 6a residing in the opposite disposed recessed portions 5a provided in holes 5. Preferably and as illustrated the anchor members have a horizontal cross-sectional shape, rectangular in the present instance, the devolpment of which involves the use of not less than two linear dimensions.

Referring to Figs. 3 and 4, 1 indicates one of two adjacent leaves of a leaf spring, 2 indicates the other of said leaves, 3 indicates each of two relatively spaced elongated and round-ended holes provided in leaf 2 adjacent an end thereof, 7 indicates a leaf-end friction bearing structure spacing said leaves, 8 indicates each of two relatively spaced elongated through holes provided in the bearing structure, 8a indicates oppositely disposed recessed portions provided in hole 8, 9 indicates each of two cross-shaped soft rubber anchor members equipped with oppositely disposed integral flange portions 9a residing in the oppositely disposed recessed portions 8a provided in holes 8.

A marked advantage in the use of soft rubber as an anchoring means for holding a leaf-end friction bearing structure in position between two adjacent leaves of a leaf spring is the gentle action of this resilient material against the bearing structure and this gentle action is particularly important if the bearing structure is of more or less fragile nature. A rubber anchor member however and its relationship with the holes with which it cooperates must be judiciously designed if the inherent cushioning ability of soft rubber is to be made available. It is well known that soft rubber is about the most if not the most non-compressible substance known. It seems that all one can do with soft rubber is to deform it and that if it is desired that the rubber member be deformed at one point one must provide for a flow exit if that deformation is to be permitted to take place. Hence, if the rubber member is too closely confined, any pressure against it will be too solidly opposed and repeated applications of the deforming forces will not be readily absorbed and cushioned and will ultimately cause a breakdown of the soft rubber structure or the bearing structure or both of them. Speaking specifically of the use of soft rubber as anchoring means for holding a bearing structure in position between two leaves of a leaf spring, it must be remembered that the forces acting against the rubber are shearwise and occur as incessant hammer blows and this means, if the rubber is to survive, these rapid-fire deformations must be given a closeby unopposed flow exit and that this flow exit must be adequate if the cushioning action is to be adequate. If considerably elongated and if the total top or bottom area of the rubber anchor member is given an unrestricted flow exit as here shown, the member may be made to fit the holes, that is, occupy the full volumetric size of the holes. These unconfined and large top and bottom surface areas or even the bottom area alone will adequately accommodate the flow of the rubber and hence will permit adequate deformation and cushion, against the longitudinal shear forces encountered in service, to prevent a break-down of the rubber. I prefer however that the anchor member shall not be made to fit both the holes and instead that either one or both of the holes shall be made to have a horizontal cross sectional area greater than the means horizontal cross sectional area of that portion of the anchor member which is positioned within such hole or holes. In each of the illustrations, Figs. 1 and 3, I show an elongated rubber member cooperating with an elongated round-ended hole in the spring leaf. Even with the ease of deformation provided by the extent of elongation of the anchor members as here shown I prefer the additional ease provided by making one or both of the holes round-ended because of the increased float action which is thus permitted between the bearing structure and the leaf to which it is anchored in order to provide for a more uniform distribution of the work between both surfaces of the bearing structure and which action is included as one of my objects. I also prefer the round-ended hole in both of the members for greater ease of assembling the rubber member into the holes. In connection with these elongated round-ended holes I prefer that the rubber anchor member be made to provide a slightly snug degree of fit between it and the sides of the holes. This slightly snug lateral fit provides the best possible resistance to counteract forces tending to cause turning movements of the bearing structure with relation to the leaf to which it is anchored. These snug lateral fits also provide a grip between the anchor member and the holes which is adequate to hold the parts firmly together and against loss from between the leaves during the roughest handling of the spring in transit from the spring maker to the car maker and also during the roughest treatment which could be given the spring in service.

When used in connection with leaves of S. A. E. flat section, the positioning of the T-section anchor member 6 in the recessed hole 5 as shown in Fig. 2 has a marked advantage over the positioning of the T-section anchor member 4 in the vertically straight-sided hole 3a as shown in Figure 2 in my copending application as of this date Serial No. 155,913. This advantage has to do with ease and speed of assembly of anchor member 6 in hole 5 as compared to the assembly of anchor member 4 in hole 3a of the copending application. In assembling the latter, namely the anchor member 4 into the vertically straight-sided hole 3a, there is no dead stop against which to push the head. If the head or flanged portion of anchor member 4 is not pushed far enough into hole 3a, from either direction, the anchor member will most probably fall out of the hole before it reaches the spring leaf assembly bench. If pushed too far in either direction, the head portion of the anchor member will be completely out of the hole even before the intended assembly of bearing structure and anchor member even starts on its way to the spring leaf assembly bench. The assembling of this anchor member 4 in hole 3a in the copending application Serial No. 155,913 may be accomplished at the time of assembling the leaves together by first positioning anchor member 4 into leaf hole 2a and the bearing structure 3 then positioned over the head or flange portion of anchor member 4. This procedure however, would give the spring leaf assembler three separate parts to handle, two anchor members and the bearing structure, in addition to the two leaves. With the recessed construction shown in Fig. 2 of this present application, it is clearly seen that anchor member 6 can be quickly pushed into hole 5 and against the dead stop provided by the floor of the recessed portions in bearing structure 4. This work can be done at a station removed from the spring leaf assembly bench and without any danger of the two anchor members falling out of place during movement and handling of the assembly to the leaf assembly bench. These soft rubber anchor members are made to fit the sides of the holes with a slight degree of snugness and hence once in place they cannot fall out accidentally. Referring to Fig. 4 of the present application it will be clearly seen that anchor member 9 can be similarly assembled with bearing structure 7 against a dead stop provided by the ceiling of the recessed portions in hole 8.

It will be noted that any of the anchor members here shown are of a shape permitting low cost production either by extrusion and cutting to length or by readily made molding equipment.

It will be noted also that the bearing structures as here anchored, upon the spreading of the leaves, are readily removable and replaceable in kind.

The term "elongated" as here employed refers to a horizontal and not a vertical direction. The term "appreciably greater" as here employed refers to a space greater than that which would be necessary in line with accepted practice in the matter of tolerance allowances suitable for a free fitting of two parts.

Having thus described and illustrated my invention, I claim:

1. In combination, two adjacent leaves of a leaf spring, a leaf-end friction bearing structure spacing said leaves and presenting to at least one of them a surface of sufficient yieldability to conform to irregularities thereof, and anchoring means for limiting longitudinal, lateral and turning movements of said bearing structure with relation to said leaves while in service, said anchoring means comprising a soft rubber anchor member in deep penetrative engagement with a through hole provided in both said bearing structure and one of said leaves adjacent an end thereof, said anchor member presenting laterally extending flange means and said hole in said bearing structure being provided with laterally extending recess means, said flange means residing in said recess means and being exposed to a surface of one of said leaves, said flange means thus acting to maintain said anchor member in predetermined vertical position with relation to said holes.

2. In combination, two adjacent leaves of a leaf spring, a leaf-end friction bearing structure spacing said leaves and presenting to at least one of them a surface of sufficient yieldability to conform to irregularities thereof, and anchoring means for limiting longitudinal, lateral and turning movements of said bearing structure with relation to said leaves while in service, said anchoring means comprising a soft rubber anchor member in deep penetrative engagement with a through hole provided in both said bearing structure and one of said leaves adjacent an end thereof, said anchor member presenting laterally extending flange means and said hole in said bearing structure being provided with laterally extending recess means, said flange means residing in said recess means and being exposed to a surface of one of said leaves, said flange means thus acting to maintain said anchor member in predetermined vertical position with relation to said holes, the mean horizontal cross sectional area of one of said holes being appreciably greater than the mean horizontal cross sectional area of that portion of said anchor member which is positioned within that hole.

3. In combination, two adjacent leaves of a leaf spring, a leaf-end friction bearing structure spacing said leaves and presenting to at least one of them a surface of sufficient yieldability to conform to irregularities thereof, and anchoring means for limiting longitudinal, lateral and turning movements of said bearing structure with relation to said leaves while in service, said anchoring means comprising a soft rubber anchor member in deep penetrative engagement with a through hole provided in both said bearing structure and said one leaf adjacent an end thereof, said anchor member presenting laterally extending flange means and said hole in said bearing structure being provided with laterally extending recess means, said flange means residing in said recess means and being exposed to a surface of one of said leaves, said flange means thus acting to maintain said anchor member in predetermined vertical position with relation to said holes, the portion of said anchor member which lies in the plane of direct shear forces against it, being of a horizontal cross sectional shape the development of which involves the use of not less than two linear dimensions.

4. In combination, two adjacent leaves of a leaf spring, a leaf-end friction bearing structure spacing said leaves and presenting to at least one of them a surface of sufficient yieldability to conform to irregularities thereof, and anchoring means for limiting longitudinal, lateral and turning movements of said bearing structure with relation to said leaves while in service, said anchoring means comprising a soft rubber anchor member in deep penetrative engagement with a through hole provided in both said bearing structure and one of said leaves adjacent an end thereof and one of which holes is round-ended, said anchor member presenting laterally extending flange means and said hole in said bearing structure being provided with laterally extending recess means, said flange means residing in said recess means and being exposed to a surface of one of said leaves, said flange means thus acting to maintain said anchor member in predetermined vertical position with relation to said holes.

5. In combination, two adjacent leaves of a leaf spring, a leaf-end friction bearing structure spacing said leaves and presenting to at least one of them a surface of sufficient yieldability to conform to irregularities thereof, and anchoring means for limiting longitudinal, lateral and turning movements of said bearing structure with relation to said leaves while in service, said anchoring means comprising a soft rubber anchor member supported by said bearing structure and in deep penetrative engagement with a through hole provided in both said bearing structure and one of said leaves adjacent an end thereof, said anchor member having integral therewith laterally extending flange means and said hole in said bearing structure being provided with laterally extending recess means, said flange means residing in said recess means and being exposed to a surface of one of said leaves, said flange means thus acting to maintain said anchor member in predetermined vertical position with relation to said holes.

6. In combination, two adjacent leaves of a leaf spring, a leaf-end friction bearing structure spacing said leaves and presenting to at least one of them a surface of sufficient yieldability to conform to irregularities thereof, and anchoring means for limiting longitudinal, lateral and turning movements of said bearing structure with relation to said leaves while in service, said anchoring means comprising a soft rubber anchor member supported by one of said leaves and in deep penetrative engagement with a through hole provided in both said bearing structure and said one leaf adjacent an end thereof, said anchor member having integral therewith laterally extending flange means and said hole in said bearing structure being provided with laterally extending recess means and being exposed to a surface of said one leaf, said flange means thus acting to maintain said anchor member in predetermined vertical position with relation to said holes.

References Cited in the file of this patent

UNITED STATES PATENTS

| | | |
|---|---|---|
| 1,447,191 | Vetter | Mar. 6, 1923 |
| 2,028,299 | Swinton | Jan. 21, 1936 |
| 2,172,132 | Schneible | Sept. 5, 1939 |
| 2,209,403 | Kittner et al. | July 30, 1940 |
| 2,280,201 | Thompson | Apr. 21, 1942 |